(12) United States Patent
Makino et al.

(10) Patent No.: US 6,336,410 B1
(45) Date of Patent: Jan. 8, 2002

(54) RAILWAY VEHICLE AND RAILWAY VEHICLE USE BOGIE CAR

(75) Inventors: Toshiaki Makino; Michio Sebata; Motomi Hiraishi; Minoru Nakamura, all of Kudamatsu (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/707,819

(22) Filed: Nov. 8, 2000

(30) Foreign Application Priority Data

Jan. 14, 2000 (JP) .......................................... 12-010108

(51) Int. Cl.[7] .................................................. B61F 3/00
(52) U.S. Cl. ..................................................... 105/199.1
(58) Field of Search ........................... 105/199.1, 199.2, 105/199.4, 453

(56) References Cited

U.S. PATENT DOCUMENTS

| | | | | |
|---|---|---|---|---|
| 3,376,831 A | * | 4/1968 | Eaton et al. ............. | 105/199.1 |
| 4,273,055 A | * | 6/1981 | Borgeaud et al. ........ | 105/199.1 |
| 4,744,604 A | | 5/1988 | Lewis et al. | |
| 5,086,706 A | * | 2/1992 | Boivin ....................... | 105/168 |
| 5,690,034 A | * | 11/1997 | Schahl et al. ............. | 105/199.1 |
| 5,775,049 A | | 7/1998 | Fricke | |

FOREIGN PATENT DOCUMENTS

| | | |
|---|---|---|
| DE | 2533088 | 3/1977 |
| WO | 8505425 | 12/1985 |

* cited by examiner

*Primary Examiner*—Mark T. Le
(74) *Attorney, Agent, or Firm*—Antonelli, Terry, Stout & Kraus, LLP

(57) ABSTRACT

A traction link of a bogie frame is connected to a connection member which extends down from a car body. In an interior portion of the connection member, a large number of particle-shaped members are accommodated. The rotation vibrations which are generated from a system drive of a running electric motor, a reduction gear unit and a shaft coupling are transmitted to the connection member and the car body through the traction link. The vibration energy generated in the connection member is converted to kinetic energy in the particle-shaped members by collisions between the particle-shaped members inside the connection member and, so that the vibrations in the connection member can be reduced. Accordingly, the propagation of the vibrations to the car body can be restrained. In a railway vehicle bogie car, the vibrations which are generated by an unbalance of the drive system can be restrained, and the noise inside the car produced by the vibrations can be reduced.

6 Claims, 3 Drawing Sheets

RAILWAY VEHICLE AND RAILWAY VEHICLE USE BOGIE CAR

BACKGROUND OF THE INVENTION

The present invention relates to a railway vehicle and a railway vehicle bogie car.

As described on Japanese application utility model publication No. Sho 58-1406, a bogie frame and a car body of a railway vehicle are connected using a traction link (hereinafter simply called a "link"). On both ends of the link, namely in front and the back, a respective rubber bush is arranged. The rubber bush is designed to fully respond to and accommodate a compression load which occurs sometimes in the forward and backward direction (in link direction). Further, the link is connected to a connection member, called a center pin, which projects downwardly from a lower face of the car body.

Use of a sound shielding panel accommodating particle-shaped members has been suggested in Japanese application patent laid-open publication No. Hei 10-266388. In a floor of a car body formed of an aluminum honeycomb panel, in an interior portion of the panel, powder having a particle size of 30 micrometer–1000 micrometer is accommodated, so that vibration control in an up and down direction of the floor of the car body can be carried out.

The vibrations in the forward and backward directions (running direction of the vehicle) are transmitted to a car body through the two rubber bushes and the link, for example. For this reason, the noise inside of the car becomes high. In particular, solid propagation vibrations having a rotation frequency component in the 80–300 Hz band, which are generated by an unbalance of the drive system, are transmitted to the bogie frame, and these vibrations vibrate the floor. Accordingly, there is a problem in that these vibrations of the floor cause an increase in the noise inside of the car.

In the rotation vibrations generated by the unbalance in the drive system, a component having a size of less than 10 m/s$^2$ from one time to four times f1, which is the basic rotation vibration component of an electric motor shaft, is comparatively remarkable. These rotation vibration components f1–4f1 are transmitted as solid propagation vibrations to the car body through the link, and they promote up and down vibrations of the floor of the car body, which generate noise inside of the car.

In particular, during acceleration of the car, a 2f1 component is generated in the forward and backward directions, in the right and left directions, and in the up and down directions; and, in particular, the vibrations in the forward and backward directions promote an increase in the noise inside of the car. Further, during deceleration and coasting, the increase in the forward and backward vibrations of the f1 component and the increase in the forward and backward vibrations of the 3f1 component occur remarkably.

For example, when the rotation vibration component f1 is 80 Hz, the rotation vibration component 2f1 is 160 Hz, the rotation vibration component 3f1 is 240 Hz and the rotation vibration component 4f1 is 320 Hz. For this reason, it is required to reduce the vibrations by about more than 100 Hz.

SUMMARY OF THE INVENTION

An object of the present invention is to provide a railway vehicle and a railway vehicle bogie car, wherein noise inside of the car can be reduced by a simple construction.

The above-stated object can be attained by a railway vehicle wherein a connection member, which extends down from a lower face of a car body, and a bogie frame are connected using a traction link, and in an interior portion of the connection member, a large number of particle-shaped members are relatively movably accommodated.

The above-stated object can be attained by a railway vehicle bogie car wherein a connection member, which extends down from a lower face of a car body, and a bogie frame are connected according to a traction link, and in an interior portion of the connection member, a large number of particle-shaped members are relatively movably accommodated.

DESCRIPTION OF THE INVENTION

Figure 2:
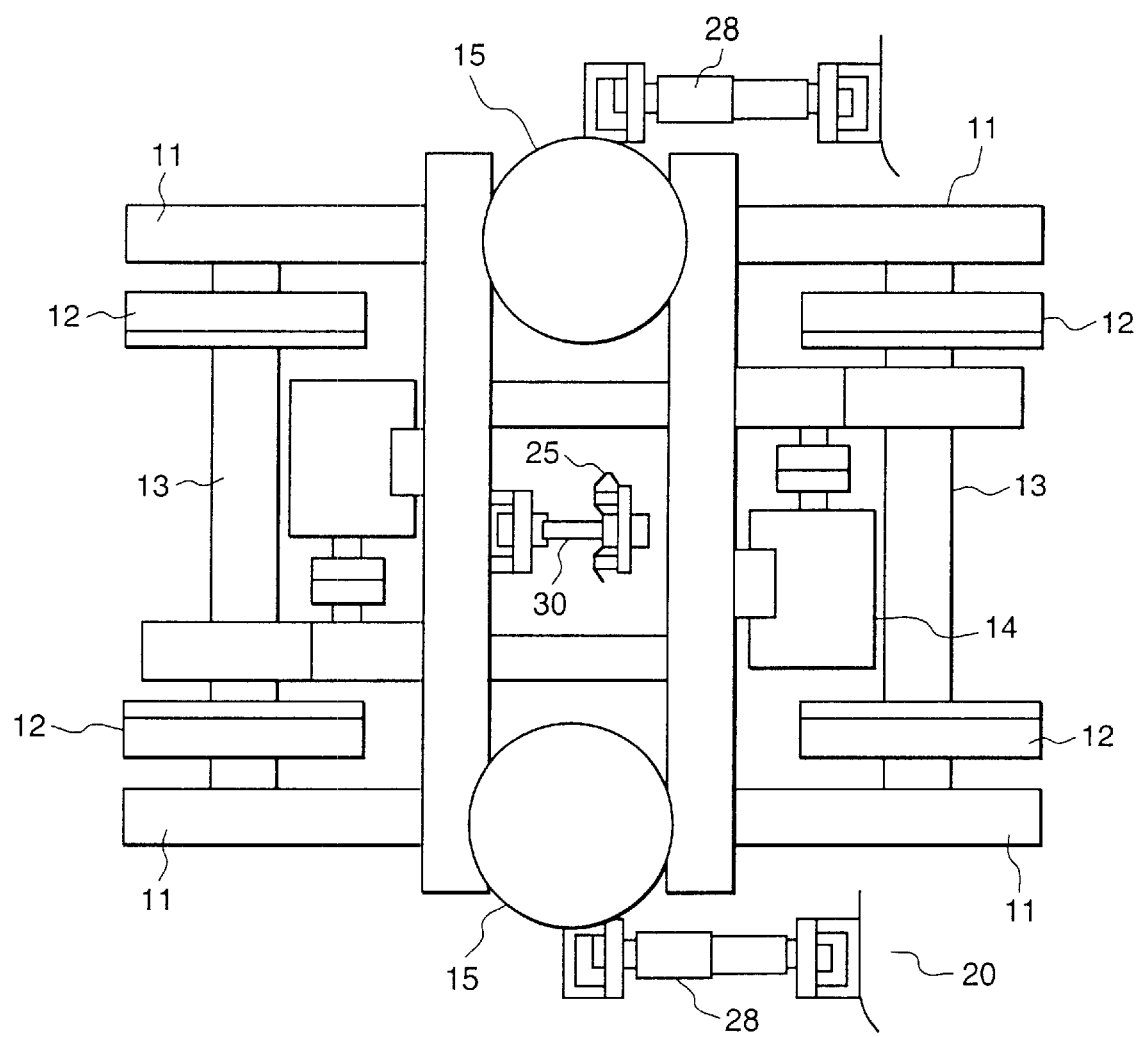
FIG. 2 is a plane view showing a bogie car of a railway vehicle according to the present invention.
Figure 3:
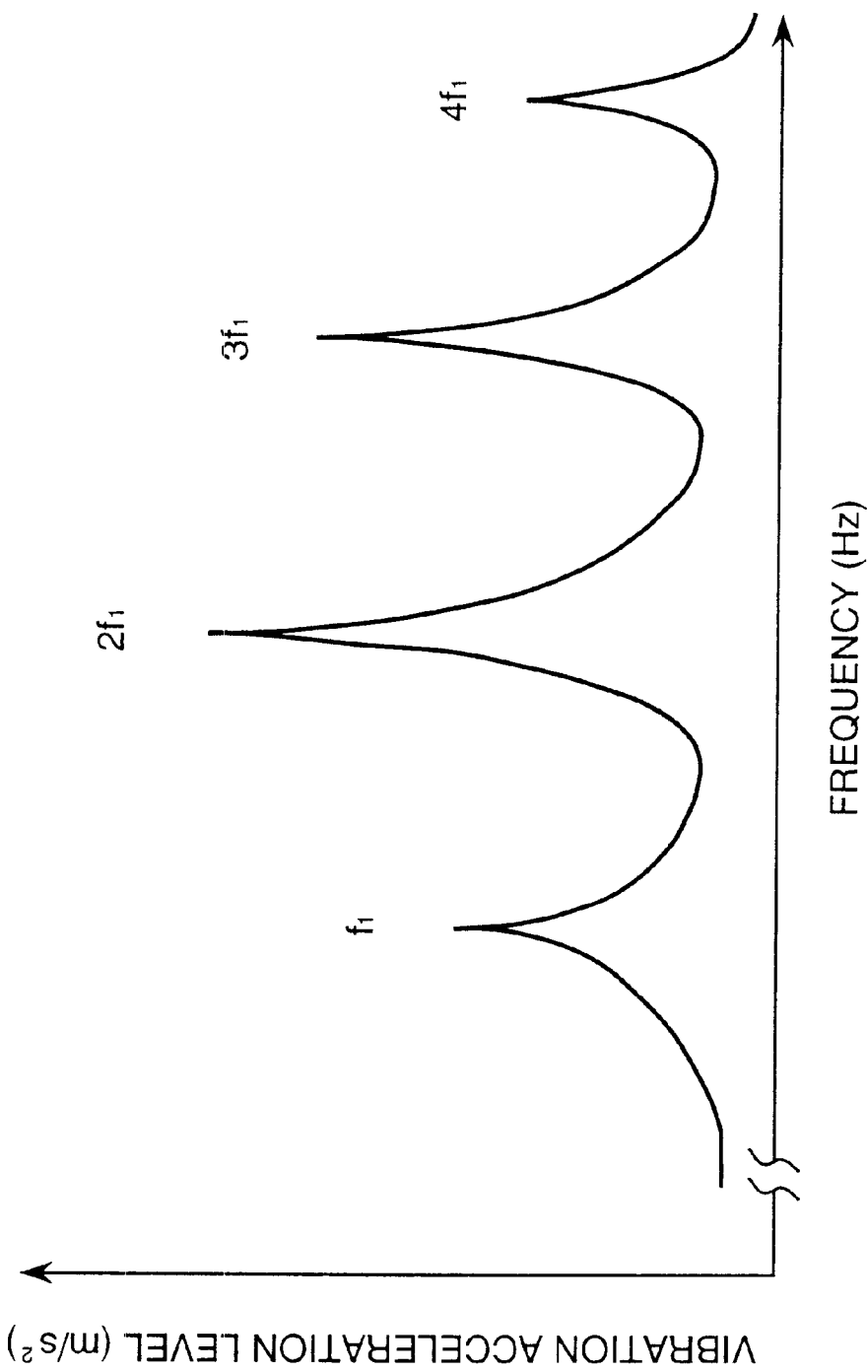
FIG. 3 is graph showing a vibration characteristic of the railway vehicle bogie car.

One embodiment of a railway vehicle and a railway vehicle bogie car according to the present invention will be explained with reference to FIG. 1 to FIG. 3. As shown in FIG. 2, a bogie frame 11 of a bogie car is supported by two car axles 13, each of which carry two vehicle wheels 12, and the bogie frame 11 carries a reduction gear unit which comprises an electric motor 14 for driving the wheel axles 13 via gears. The bogie car frame 11 additionally supports a car body 20 through a pair of air cushion member 15.

A connection member 40 (generally called a "center pin"), which extends down from a lower face of the car body, and the bogie frame 11 are connected by a traction link 30 (herein called a "link"). The link 30 transmits a forward and backward force, and this link is arranged to extend horizontally in the running direction of the vehicle.

End portions of the right and left sides of the bogie frame 11 are connected to the car body 20 through yaw dampers 28. Both ends of each yaw damper 28 are connected to the bogie car frame 11 and the car body 20, respectively, through a rubber bush similar to the link 30. The yaw damper 28 can prevent meandering movement during the running of the vehicle.

Figure 1:
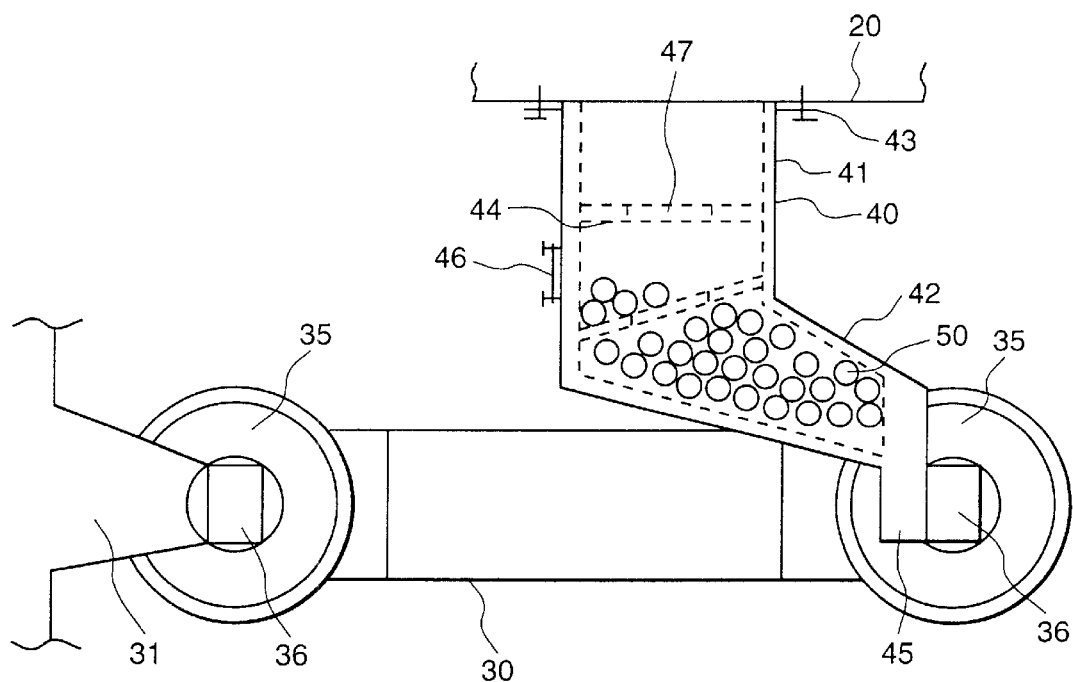
FIG. 1 is a side view showing a traction link portion of a railway vehicle and a railway vehicle bogie car representing one embodiment according to the present invention.

Both ends of the link 30 are connected to the bogie car 11 and the connection member 40, respectively, through a rubber bush 35 and a pin 36, as seen in FIG. 1. The connection member 40 is arranged to have an inclined portion in connection portion between the car body 20 to the link 30. A cross-section of a lower end portion of a coupling member 45 of the connection member 40 has an inverted U-shaped. The link 30 is arranged horizontally in the running direction of the car body 20 and passes through the above-stated U-shaped portion of the coupling member 45. The tip end of a second inclined portion 42 of the connection member 40 carries the coupling member 45.

On the bogie frame 11, U-shaped cross-sectional coupling 31 is arranged. The link 30 is connected at one end to the coupling member 31 of the bogie frame 11 and at the other end to the coupling member 45 of the connection member 40. This construction is based on a known technique.

The connection member 40 has a horizontal cross-section having a quadrilateral shape and is formed by welding plates constituting the four faces thereof. An upper face flange 43 is fixed to a lower face of the car body 20 through bolt fasteners. In the interior portion, the plates constituting the four faces have reinforcement plates 44 welded thereto in plural stages extending in the up and down direction. In each reinforcement plate 44, a hole 47 is opened at a central portion.

In a space of the interior portion of the connection member 40, a vibration control mechanism in the form of a large number of particle-shaped members 50 is accommodated. The particle-shaped members 50 are inserted through an opening which is provided on a side face of the connection member 40. This opening is sealed hermetically by a lid 46 or a sealing agent and the like. The particle-shaped members 50, which inserted from the upper portion can drop down and be guided by inclining the connection member 40.

The particle-shaped members 50 are spherical members formed of a ferro system or a lead system material. A particle size of the particle-shaped members 50 is 0.1 mm–10 mm degree. However, the particle-shaped members 50 do not need to have a spherical shape. In a manufacturing process, the particle-shaped members 50 can be formed using a non-spherical-shaped member or a multi-angle crush-shaped member.

It is preferable to employ a particle-shaped members 50 having a large fill density. When the fill density of the particle-shaped members 50 is small, the noise damping effect becomes small, but when the fill density of the particle-shaped members 50 is excessively large, the movement of the particle-shaped members 50 becomes bad, the result that the vibration control effect is lessened. Further, since the space inside of the connection member 40 is large, when the fill density of the particle-shaped members 50 becomes excessively large, it invites an undesirable weight increase.

The filling amount of the particle-shaped members 50 is determined according to various experimental results. According to the filling amount of the particle-shaped members 50, the position of the above-stated opening for accommodating the particle-shaped members 50 is determined. The amount of particle-shaped members 50 shown in FIG. 1 represents one example.

It is preferable to employ particle-shaped members having a comparatively large particle size. For example, the particle size of the particle-shaped members 50 can be several mm. When the particle size of the particle-shaped members 50 is small, as represented by a powder, the manufacturing cost becomes high. When the particle size of the particle-shaped members 50 is large, the particle-shaped members 50 can be manufactured with a comparative low cost.

Further, to provide for anti-corrosion, corrosion prevention or abrasion prevention of the particle-shaped members 50 can be attained by using an absorption agent (for example, the red ocher and the like) enclose the members.

With the above-stated construction, when the bogie frame 11 vibrates in response to the drive system vibrations, the connection member 40 vibrates through the link 30. With this, the particle-shaped members 50 accommodated in the connection member 40 vibrate, and in response to the collision of the particle-shaped members 50 with each other and the collision of the particle-shaped members 50 with the plates of the connection member 40, the vibrations in the connection member 40 can be reduced and the transmission of the vibrations to the car body 20 can be reduced.

Further, in proportion to the increase in the specific gravity of the particle-shaped members 50, the vibration energy of the connection member 40 during the collision time is converted to kinetic energy in the particle-shaped members 50 with a good efficiency. Accordingly, the vibration energy becomes small and the vibrations of the connection member 40 can be reduced.

In particular, in response to the vibrations of the drive system, since the movement in the forward and backward directions of the particle-shaped members 50 in the interior portion of the connection member 40 are not against the force of gravity (it is unlikely to have vibrations of more than 10 m/s$^2$), the particle-shaped members 50 can be activated with a small excitation force.

For this reason, the vibrations in the forward and backward directions which are solid-propagated to the car body 20 from the connection member 40 can be reduced. Accordingly, the vibration in the up and down directions on the floor face of the car body 20 is reduced, and the noise inside of the car which radiates from the floor face of the car body 20 can be reduced.

Namely, in response to the forward and backward vibrations which are solid-propagated through the link 30, the particle-shaped members 50 repeat collisions within minute ranges. For this reason, the vibration energy generated to the connection member 40 is converted to kinetic energy in the particle-shaped members 50. As a result, the vibrations in the connection member 40 can be reduced.

In comparison with the case where powder is deposited in the floor of the car body 20, the reduction of the vibrations in the forward and backward directions of the connection member 40 an not be attained. With respect to vibrations in the forward and backward directions of the connection member 40, even those responsive to a small excitation force, the particle-shaped members 50 can move actively (it is unlikely to have vibrations of more than 10 M/s$^2$ which go against the force of gravity).

Accordingly, since the forward and backward vibrations at the connection member 40 are restrained, an increase in the up and down vibrations on the floor face of the car body 20 can be restrained, and the noise inside the side car can be reduced. Further, since the connection member 40 has a comparatively light weight, the vibrations can be reduced due to the light weight of the apparatus.

Further, during acceleration, deceleration and coasting, since the vibrations in the forward and backward directions increase further, the vibration control effect can be even more remarkable. The movements of the particle-shaped members 50 in this case, in response to a large excitation force, are produced even more actively, so that the vibration control effect can be increased.

Further, the particle-shaped members 50 can be accommodated in the interior portion of the link 30. As clearly understood from the above-stated explanation, it is preferable to make the weight of the particle-shaped members 50 large. However, since the diameter of the link 30 is comparatively small, it is preferable to make the fill density of the particle-shaped members 50 as large as possible. However, it is necessary to vibrate the particle-shaped members 50 in response to vibrations of the link 30. Further, on an outer face of the link 30, it is possible to mount a vessel in which the particle-shaped members 50 can be accommodated.

Further, the longitudinal cross-sectional shape of the connection member 40 has a substantially L-shape. Namely, the connection member 40 comprises a first portion 41 which extends downwardly from the lower face of the car body 20, and a second portion 42 which extends in a more horizontal direction below the above-stated first portion 41. The traction link 30 is connected to a tip end of the coupling member 45 of the second portion 2 of the connection member 40, which extends in a generally horizontal direction. The particle-shaped members 50 are accommodated in the interior portion of the second portion 42 of the connection member 40.

As stated above, since the traction link 30 is connected to the horizontally extending second portion 42 of the connection member 40, the second portion 42 of the connection member 40 can be shifted easily in the up and down directions. In this second portion 42 of the connection member 40, the particle-shaped members 50 are accommodated, so that the particle-shaped members 50 can be moved actively and the vibrations can be reduced easily.

Further, a lower face of the second portion 42 of the connection member 40 is inclined. Accordingly, the particle-shaped members 50 can be moved easily and the vibrations can be reduced. For example, the particle size of the particle-shaped members 50 which are accommodated in the link 30 is 1 mm, and the particle size of the particle-shaped members 50 which are accommodated in the connection member 40 is 3 mm, which is bigger than that of the particle-shaped members 50 accommodated in the link 30.

With the above-stated construction, since by matching the characteristics of the respective constituent parts (the link 30, the connection member 40) the particle-shaped members 50 can be accommodated in such a way that vibration control can performed to a maximum extent.

Further, in the member which forms the bogie frame 11 in the vicinity of the coupling 31, a large number of the particle-shaped members 50 are accommodated, so that the transmission of vibrations to the link 30 can be lessened.

In the above-stated embodiment according to the present invention, the connection member 40 and the bogie frame 11 are connected by one traction link 30, however it is possible to provide an arrangement in which the connection member 40 and the bogie frame 11 are connected by plural traction links.

The technical range of the present invention is not limited to the specific terms utilized in each of the claims and the stated means for solving the problems of the prior art, but includes a range of which the man of ordinary skill in the technical field of the present invention would find equivalent.

According to the present invention, with a simple construction in which particle-shaped members 50 are accommodated movably within a connection member 40 for connecting the bogie car and the car body 20, the transmission of vibrations which are generated from the drive system can be restrained, and, accordingly, the noise inside the car can be reduced.

What is claimed is:

1. A railway vehicle having a car body supported on a bogie frame, a connection member, which extends down from a lower face of said car body and said bogie frame being connected by a traction link, and, in an interior portion of said connection member, a large number of particle-shaped members are movably accommodated.

2. A railway vehicle according to claim 1, characterized in that:

said connection member comprises a first portion which extends down from said lower face of said car body and a second portion which extends in a generally horizontal direction from a lower end portion of said first portion;

said traction link is connected to an end portion of said second portion of said connection member; and said particle-shaped members are accommodated in an interior portion of said second portion of said connection member.

3. A railway vehicle according to claim 2, characterized in that a lower face of said second portion of said connection member is inclined.

4. A railway vehicle bogie car having a bogie frame for supporting a car body, a connection member, which extends down from a lower face of said car body, and said bogie frame being connected by means of a traction link, and, in an interior portion of said connection member, a large number of particle-shaped members are movably accommodated.

5. A railway vehicle bogie car according to claim 4, characterized in that:

said connection member comprises a first portion which extends down from said lower face of said car body and a second portion which extends in a generally horizontal direction from a lower end portion of said first portion;

said traction link is connected to an end portion of said second portion of said connection member; and said particle-shaped members are accommodated in an interior portion of said second portion of said connection member.

6. A railway vehicle use bogie car according to claim 5, characterized in that a lower face of said second portion of said connection member is inclined.

* * * * *